(12) United States Patent
Lai et al.

(10) Patent No.: US 7,145,966 B2
(45) Date of Patent: Dec. 5, 2006

(54) SIGNAL QUALITY ESTIMATION FOR CONTINUOUS PHASE MODULATION

(75) Inventors: Kuei-Chiang Lai, La Jolla, CA (US); Arunava Chaudhuri, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 233 days.

(21) Appl. No.: 10/882,477

(22) Filed: Jun. 30, 2004

(65) Prior Publication Data
US 2006/0007994 A1    Jan. 12, 2006

(51) Int. Cl.
*H03D 3/22* (2006.01)
*H04L 27/22* (2006.01)

(52) U.S. Cl. ............... 375/330; 375/227; 375/283; 455/226.3; 455/296

(58) Field of Classification Search .......... 375/227, 375/231, 235, 283, 330, 346, 329, 279, 261, 375/221, 340; 455/226.3, 228, 296
See application file for complete search history.

(56) References Cited

U.S. PATENT DOCUMENTS

| | | | | |
|---|---|---|---|---|
| 5,214,675 | A * | 5/1993 | Mueller et al. | 375/340 |
| 5,371,471 | A * | 12/1994 | Chennakeshu et al. | 329/304 |
| 6,154,489 | A * | 11/2000 | Kleider et al. | 375/221 |
| 6,333,953 | B1 * | 12/2001 | Bottomley et al. | 375/316 |
| 6,449,246 | B1 * | 9/2002 | Barton et al. | 370/210 |
| 6,487,255 | B1 * | 11/2002 | Arslan et al. | 375/262 |

OTHER PUBLICATIONS

"Laurent's Representation of Binary Digital Continuous Phase Modulated Signals with Modulation Index ½ Revisited" Peter Jung, IEEE Transaction on Communications, vol. 42, No. 2/3/4/ Feb., Mar., Apr. 1994; pp. 221-224.
Exact and Approximate Construction of Digital Phase Modulations by Superposition of Amplitude Modulated Pulse (AMP); Pierre A. Laurent; IEEE Transaction of Communications, vol. Com-34, No. 2. Feb. 1986.
Abbey et al.; *A Simple Coherent Receiver for Frequency-Hopped Pulse-Driven GMSK*; Military Communications Conference Proceedings, 1999; vol. 1, Oct. 31, 1999, pp. 286-290, XP010369607.
Ghassan Kawas Kaleh; *Simple Coherent Receiver for Partial Response Continuous Phase Modulation*; IEEE Journal on Selected Areas in Communications, IEEE Inc. New York, US, vol. 7, No. 9, Dec. 1, 1989, pp. 1427-1436, XP000101038.

* cited by examiner

*Primary Examiner*—Phuong Phu
(74) *Attorney, Agent, or Firm*—Philip R. Wadsworth; Charles D. Brown; Alex C. Chen (57) ABSTRACT

A received continuous phase modulation (CPM) signal (which is formed with a set of pulse shaping functions) is approximated as a phase shift keying (PSK) modulated signal (which is formed with just the dominant pulse shaping function having the largest energy). Channel estimation and data detection are performed in accordance with the CPM-to-PSK approximation. A signal power estimate and a noise power estimate are obtained for the received CPM signal and have errors due to the CPM-to-PSK approximation. The difference $\Delta$ between the energy of the dominant pulse shaping function and the energy of the remaining pulse shaping functions is determined. An approximation error is estimated based on the signal power estimate and the difference $\Delta$. A C/I estimate for the received CPM signal is computed based on the signal power estimate, the noise power estimate, and the approximation error estimate.

29 Claims, 5 Drawing Sheets

SIGNAL QUALITY ESTIMATION FOR CONTINUOUS PHASE MODULATION

BACKGROUND

I. Field

The present invention relates generally to communication, and more specifically to signal quality estimation in a wireless communication system.

II. Background

In a wireless communication system, a transmitter first digitally processes traffic/packet data to obtain coded data. The transmitter then modulates a carrier signal with the coded data to obtain a modulated signal that is more suitable for transmission via a wireless channel. The modulation may be performed based on various modulation schemes. One modulation scheme that is widely used throughout the world is continuous phase modulation (CPM). With CPM, the phase of the carrier signal is modulated by the coded data in a continuous rather than abrupt manner. As a result, CPM has several desirable characteristics such as (1) a constant envelope for the modulated signal, which allows the signal to be transmitted using an efficient power amplifier, and (2) a compact spectrum for the modulated signal, which enables efficient utilization of the available frequency spectrum.

A modulated signal generated with CPM (or simply, a CPM signal) has a fairly complex waveform that can complicate the design of a receiver used to process the CPM signal. To simplify the receiver design, the CPM signal may be approximated as a phase shift keying (PSK) modulated signal, as described below. This approximation for the CPM signal is sufficiently accurate for many applications and is often used for a CPM receiver.

A CPM receiver often needs to derive an estimate of the received signal quality. In general, signal quality (which is denoted as "C/I" herein) may be quantified by a carrier-to-interference ratio, a signal-to-noise ratio, a signal-to-noise-and-interference ratio, and so on. The C/I estimate may be used for various purposes such as, for example, to select an appropriate data rate for data transmission. The approximation of the CPM signal as a PSK modulated signal, while simplifying the receiver design, results in an inaccurate C/I estimate for certain operating conditions. The inaccurate C/I estimate can degrade system performance.

There is therefore a need in the art for techniques to derive a more accurate C/I estimate for a CPM signal.

SUMMARY

Methods and apparatus are presented herein to address the above stated need. A CPM signal may be represented as (and formed with) a set of pulse shaping functions, as described below. To simplify the receiver design, a CPM signal may be approximated as a PSK modulated signal that is formed with just the "dominant" pulse shaping function, which is the pulse shaping function having the largest energy among all pulse shaping functions for the CPM signal. Channel estimation and data detection may be more simply performed based on this CPM-to-PSK approximation. However, if the receiver processing is performed based on this approximation, then an estimate of the signal power in the received CPM signal would contain mostly the power due to the dominant pulse shaping function, and the power due to the remaining pulse shaping functions would be treated as noise instead of signal. This then results in an inaccurate C/I estimate for high C/I conditions.

A more accurate C/I estimate may be obtained for a received CPM signal by accounting for the CPM-to-PSK approximation. A signal power estimate and a noise power estimate may be obtained for the received CPM signal. These power estimates have errors due to the CPM-to-PSK approximation. The difference $\Delta$ between the energy of the dominant pulse shaping function and the energy of the remaining pulse shaping functions may be determined, for example, by theoretical derivation, computer simulation, or empirical measurement. An approximation error may be estimated based on the signal power estimate and the difference $\Delta$. The C/I estimate may then be computed based on the signal power estimate, the noise power estimate, and the approximation error estimate. The various computation steps for the C/I estimate are described in further detail below. This C/I estimate is relatively accurate even with the CPM-to-PSK approximation and may be used for various purposes such as, for example, selecting an appropriate data rate, scaling of bursts of data prior to decoding, and so on.

In one embodiment, a method is presented for estimating signal quality (C/I) in a communication system utilizing continuous phase modulation (CPM), the method comprising: estimating signal power in a received CPM signal; estimating noise power in the received CPM signal; estimating error due to approximation of the received CPM signal with another modulation format different from CPM; and deriving a C/I estimate for the received CPM signal based on the estimated signal power, the estimated noise power, and the estimated approximation error.

In another embodiment, a method is presented for estimating signal quality (C/I) in a Global System for Mobile Communications (GSM) system, comprising: estimating signal power in a received Gaussian minimum shift keying (GMSK) modulated signal; estimating noise power in the received GMSK modulated signal; estimating error due to approximation of the received GMSK modulated signal as a phase shift keying (PSK) modulated signal; and deriving a C/I estimate for the received. GMSK modulated signal based on the estimated signal power, the estimated noise power, and the estimated approximation error.

In another embodiment, apparatus is presented that is operable to estimate signal quality (C/I) in a wireless communication system utilizing continuous phase modulation (CPM), comprising: a signal estimator operative to estimate signal power in a received CPM signal; a noise estimator operative to estimate noise power in the received CPM signal; and a C/I estimator operative to estimate error due to approximation of the received CPM signal with another modulation format different from CPM and to derive a C/I estimate for the received CPM signal based on the estimated signal power, the estimated noise power, and the estimated approximation error.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The C/I estimation techniques described herein may be used for various types of CPM signals and for various wireless communication systems. For clarity, these techniques are specifically described for a GMSK modulated signal used in GSM.

Figure 1:
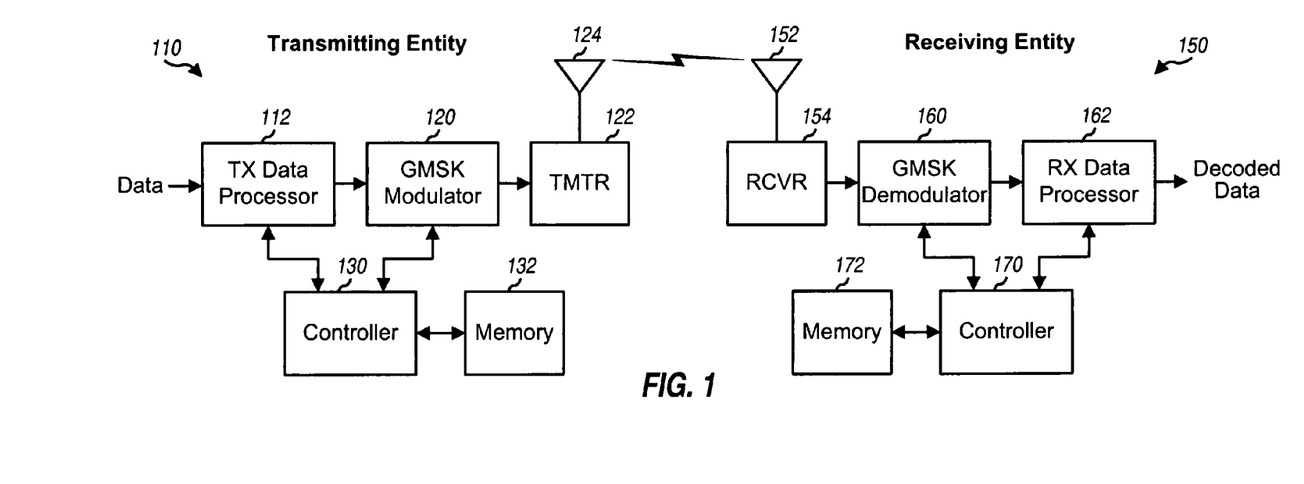
FIG. 1 shows a transmitting entity and a receiving entity in a Global System for Mobile Communications (GSM) system.

FIG. 1 shows a block diagram of a transmitting entity 110 and a receiving entity 150 in a GSM system. Transmitting entity 110 may be a base station or a wireless device, and receiving entity 150 may also be a wireless device or a base station. At transmitting entity 110, a transmit (TX) data processor 112 receives, formats, codes, and interleaves data based on one or more coding and interleaving schemes and provides a stream of input bits for a GMSK modulator 120. Modulator 120 performs GMSK modulation on the input bits, as specified by GSM and described below, and provides a GMSK modulated signal (or simply, a GMSK signal). A transmitter unit (TMTR) 122 conditions (e.g., filters and amplifies) the GMSK signal to generate a radio frequency (RF) modulated signal that is transmitted via an antenna 124 to receiving entity 150.

At receiving entity 150, the RF modulated signal transmitted by transmitting entity 110 is received by an antenna 152 and provided to a receiver unit (RCVR) 154. Receiver unit 154 conditions and digitizes the received GMSK signal and provides a stream of samples. A GMSK demodulator 160 then processes the samples, estimates the C/I of the received GMSK signal, and provides demodulated data. A receive (RX) data processor 162 deinterleaves and decodes the demodulated data to recover the data sent by transmitting entity 110. The processing by GMSK demodulator 160 and RX data processor 162 is complementary to the processing performed by GMSK modulator 120 and TX data processor 112, respectively, at transmitting entity 110.

Controllers 130 and 170 direct operation at transmitting entity 110 and receiving entity 150, respectively. Memory units 132 and 172 provide storage for program codes and data used by controllers 130 and 170, respectively.

Figure 2:
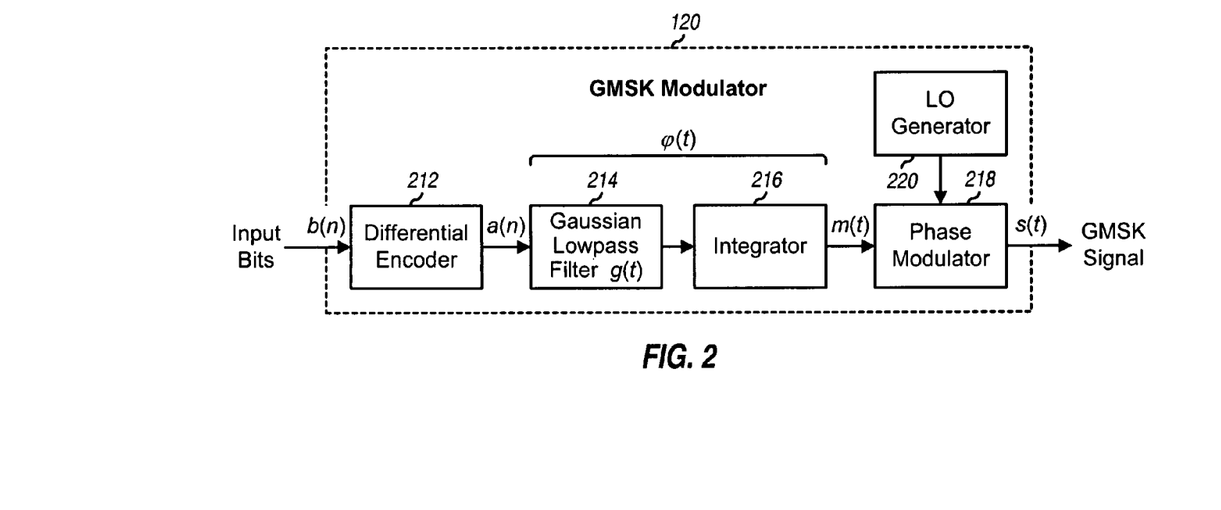
FIG. 2 shows a Gaussian minimum shift keying (GMSK) modulator at the transmitting entity.

FIG. 2 shows a block diagram of GMSK modulator 120 used to generate the GMSK signal at transmitting entity 110. Within GMSK modulator 120, a differential encoder 212 receives and performs differential encoding on the input bits {b(n)} and provides code symbols {a(n)}. Each code symbol a(n) corresponds to one input bit b(n) and is generated based on that input bit b(n) and a preceding input bit b(n-1). For simplicity, each input bit b(n) and each code symbol a(n) has a value of either +1 or −1, i.e., b(n) ∈ {−1, +1} and a(n) ∈ {−1, +1}. A Gaussian lowpass filter 214 receives and filters the code symbols. Filter 214 has a BT product of 0.3, where B denotes the −3 dB bandwidth of the filter and T denotes one symbol period. For BT=0.3, filter 214 provides a frequency pulse g(t) having a duration of approximately four symbol periods (4T) for each code symbol a(n). An integrator 216 integrates the output of filter 214 and provides a modulating signal m(t), which contains a phase pulse φ(t) for each frequency pulse g(t) and thus for each code symbol a(n). Since the frequency pulse has a duration of appropriately 4T, each code symbol a(n) is sent over four symbol periods. Because of the filtering and integration as defined by GSM, the modulating signal m(t) transitions by at most 90° or π/2 in each symbol period T. The direction of the phase transition is either clockwise or counter-clockwise on a signal constellation and is determined by the values of the code symbols. A phase modulator 218 receives the modulating signal m(t) from integrator 216 and a carrier signal from a local oscillator (LO) generator 220, modulates the carrier signal with the modulating signal, and provides the GMSK signal.

The GMSK signal, s(t), may be expressed in continuous time t as follows:

$$s(t) = \exp\left(j\left[\theta_0 + \sum_{n=-\infty}^{\infty} a(n) \cdot \varphi(t - nT)\right]\right), \quad \text{Eq (1)}$$

for $nT < t < (n+1)T$, where φ(t) is the phase pulse/function determined by filter 214 and integrator 216;

$\theta_0$ is an arbitrary phase value; and $\exp(jx) = \cos(x) + j\sin(x)$.

For simplicity, equation (1) shows a baseband representation for the GMSK signal, so that the "ωt" term for the angular frequency of the carrier signal is omitted from equation (1). Equation (1) indicates that the code symbols {a(n)} are embedded in the phase of the GMSK signal. Equation (1) also indicates that the phase of the GMSK signal is obtained by multiplying each code symbol a(n) with a delayed version of the phase function, φ(t−nT), and summing the scaled and delayed phase functions for all code symbols. For simplicity, the parentheses "{ }" for {b(n)} and {a(n)} are omitted in the following description.

The phase-modulated GMSK signal shown in equation (1) may be represented as a superposition/sum of amplitude-modulated signals in discrete time n, as follows:

$$s(n) = a_0(n) \otimes c_0(n) + a_1(n) \otimes c_1(n) + \ldots \quad \text{Eq (2)}$$

$$= \sum_{i=0} a_i(n) \otimes c_i(n),$$

where ⊗ denotes a convolution operation;

$c_i(n)$ denotes the i-th pulse shaping function; and $a_i(n)$ denotes the input symbols for pulse shaping function $c_i(n)$.

Equation (2) indicates that the complex GMSK signal, s(n), may be expressed as a sum of amplitude-modulated signals. Each amplitude-modulated signal is generated by convolving a pulse shaping function $c_i(n)$ with its corresponding input symbols $a_i(n)$. For GMSK, there are eight pulse shaping functions, which are denoted as $c_i(n)$ for i=0, 1, ... 7. Of these eight functions, $c_0(n)$ is the dominant pulse shaping function and is much larger than the remaining pulse shaping functions. The input symbols $a_i(n)$ for each pulse shaping function may be derived from the code symbols a(n) based on a known transformation associated with that function. There is a one-to-one mapping between $a_i(n)$ and $a(n)$ for each pulse shaping function. For GMSK, differential encoding is performed on the input bits $b(n)$ to obtain the code symbols $a(n)$, and the input symbols $a_0(n)$ for the dominant pulse shaping function $c_0(n)$ may be expressed as:

$$a_0(n)=j^n \cdot b(n), \quad \text{Eq (3)}$$

where $j=\sqrt{-1}$. The decomposition of a CPM signal to amplitude-modulated pulse (AMP) representation, the pulse shaping functions, and the generation of the input symbols for these pulse shaping functions are described by P. A. Laurent in a paper entitled "Exact and Approximate Construction of Digital Phase Modulations by Superposition of Amplitude Modulated Pulses (AMP)," IEEE Transactions on Communications, Vol. COM-34, No. 2, February 1986.

Figure 3:
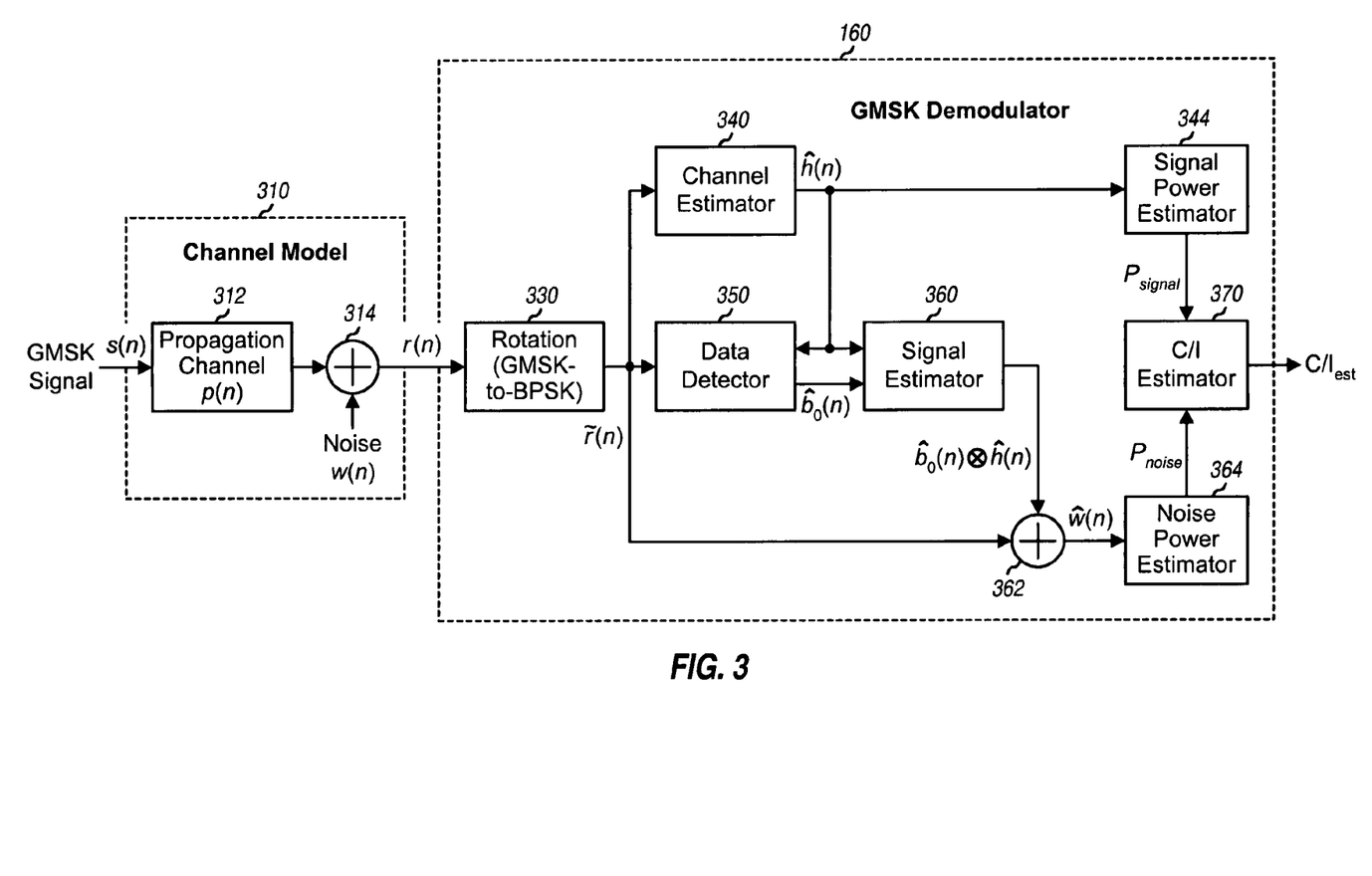
FIG. 3 shows a GMSK demodulator at the receiving entity.

FIG. 3 shows an embodiment of GMSK demodulator 160 used to process a received GMSK signal at receiving entity 150. The GMSK signal, $s(n)$, is transmitted via a channel model 310 that includes a propagation channel 312 and a summer 314 for additive noise. Propagation channel 312 has an impulse response of $p(n)$, which includes the effects of the wireless channel as well as any transmit pulse shaping performed at transmitting entity 110 and any pre-filtering performed at receiving entity 150. The "channel" noise $w(n)$ is the total noise in the received GMSK signal and includes noise from the wireless channel as well as receiver noise. The received GSM signal, $r(n)$, at the input of GMSK demodulator 160 may be expressed as:

$$r(n) = s(n) \otimes p(n) + w(n) \quad \text{Eq (4)}$$
$$= \sum_{i=0} a_i(n) \otimes \check{c}_i(n) + w(n),$$

where $\check{c}_i(n)=c_i(n)p(n)$ is the i-th pulse shaping function observed by the received GMSK signal, $r(n)$. The function $\check{c}_i(n)$ is obtained by convolving the original pulse shaping function, $c_i(n)$, with the impulse response $p(n)$ for the propagation channel.

Within GMSK demodulator 160, a rotator 330 performs phase rotation on the received GSM signal, $r(n)$, to undo the effect of the differential encoding by GMSK modulator 120. Rotator 330 rotates each successive sample in the received GMSK signal by $-90°$ (e.g., rotate the first sample by $-90°$, the second sample by $-180°$, the third sample by $-270°$, the fourth sample by $0°$, the fifth sample by $-90°$, and so on). The rotated GMSK signal, $\tilde{r}(n)$, may be expressed as:

$$\tilde{r}(n) = \sum_i b_i(n) \otimes \tilde{c}_i(n) + \tilde{w}(n), \quad \text{Eq (5)}$$

where $\tilde{c}_i(n)=j^{-n}\cdot\check{c}_i(n)=j^{-n}\cdot c_i(n)p(n)$ is the i-th "effective" pulse shaping function for the rotated GMSK signal, $\tilde{r}(n)$; $b_i(n)=j^{-n}\cdot a_i(n)$ denotes the input symbols for function $\tilde{c}_i(n)$; and $\tilde{w}(n)$ is a rotated version of the channel noise $w(n)$.

The input symbols $b_i(n)$ for the i-th effective pulse shaping function, $\tilde{c}_i(n)$, are generated by rotating the input symbols $a_i(n)$ for the i-th original pulse shaping function, $c_i(n)$. The rotation results in the input symbols for $\tilde{c}_0(n)$ being equal to the input bits into the GMSK modulator, or $b_0(n)=j^{-n}\cdot a_0(n)=b(n)$, which is obtained using $a_0(n)=j^n\cdot b(n)$ in equation (3).

To simplify the receiver processing, the rotated GMSK signal may be approximated as a binary phase shift keying (BPSK) signal, as follows:

$$\hat{r}(n)=b_0(n)\tilde{c}_0(n)+\tilde{w}(n), \quad \text{Eq (6)}$$

where $\hat{r}(n)$ is the estimated GMSK signal. The GMSK-to-BPSK approximation shown in equation (6) relies on the fact that the dominant pulse shaping function, $c_0(n)$, is much larger than the remaining pulse shaping functions. In this case, a single term for $\tilde{c}_0(n)$ in the summation for the rotated GMSK signal, $\tilde{r}(n)$, in equation (5) is used for the estimated GMSK signal, $\hat{r}(n)$, in equation (6). The estimated GMSK signal, $\hat{r}(n)$, is a good approximation of the rotated GMSK signal, $\tilde{r}(n)$, when $c_0(n)$ is much larger than all other pulse shaping functions. Since the estimated GMSK signal, $\hat{r}(n)$, contains only one pulse shaping function, channel estimation and data detection are simplified.

A channel estimator 340 receives the rotated GMSK signal, $\tilde{r}(n)$, and derives an estimate of the channel impulse response, $\hat{h}(n)$, observed by the rotated GMSK signal. The channel estimation is performed in accordance with the GMSK-to-BPSK approximation shown in equation (6), so that input symbols $b_0(n)$ for a known training sequence are used to derive the channel impulse response estimate, as described below. Because of this GMSK-to-BPSK approximation, the channel impulse response estimate approximates and resembles the dominant effective pulse shaping function, or $\hat{h}(n) \approx \tilde{c}_0(n)$.

A data detector 350 receives the rotated GMSK signal, $\tilde{r}(n)$, and the channel impulse response estimate, $\hat{h}(n)$, and performs data detection to recover the input symbols $b_0(n)$ for the dominant pulse shaping function. Data detector 350 may implement a maximum likelihood sequence estimator (MLSE) that determines a sequence of symbols that is most likely to have been transmitted given the rotated GMSK signal, $\tilde{r}(n)$, and the channel impulse response estimate, $\hat{h}(n)$. Data detection for GSM is known in the art and not described herein. Data detector 350 provides hard decisions/bit estimates $\hat{b}_0(n)$, which are estimates of the input symbols $b_0(n)$. The bit estimates $\hat{b}_0(n)$ are deinterleaved and decoded by RX data processor 162 to obtain decoded data (not shown in FIG. 3).

To obtain a C/I estimate, a signal estimator 360 receives and convolves the channel impulse response estimate, $\hat{h}(n)$, with the bit estimates, $\hat{b}_0(n)$, to generate a reconstructed signal. This reconstructed signal is an estimate of the signal component in the rotated GMSK signal due to the dominant pulse shaping function. A summer 362 receives and subtracts the reconstructed signal from the rotated GMSK signal to obtain a noise estimate, $\hat{w}(n)$, as follows:

$$\hat{w}(n)=\tilde{r}(n)-\hat{b}_0(n)\hat{h}(n), \quad \text{Eq (7)}$$

where $\hat{w}(n)$ is an estimate of the noise $\tilde{w}(n)$ in the rotated GMSK signal. Although not shown in FIG. 3 for simplicity, the rotated GMSK signal is typically delayed prior to summer 362 to be time-aligned with the reconstructed signal.

A signal power estimator 344 computes an estimate of the signal power, $P_{signal}$, as follows:

$$P_{signal} = \sum_{n=0}^{M-1} |\hat{h}(n)|^2, \quad \text{Eq (8)}$$

where M is the number of taps for the channel impulse response estimate, $\hat{h}(n)$. M is also the length of the channel impulse response estimate. The signal power estimate may also be derived based on the output from signal estimator 360, or $P_{signal}=E[|\hat{b}_0(n)\hat{h}(n)|^2]$, where $E[x]$ is the expected value of x. A noise power estimator 364 computes an estimate of the noise power, $P_{noise}$, as follows:

$$P_{noise} = \frac{1}{N} \cdot \sum_{n=0}^{N-1} |\hat{w}(n)|^2 = E[|\hat{w}(n)|^2]. \quad \text{Eq (9)}$$

In GSM, data is transmitted in bursts, with each burst carrying a sequence of N input bits, or $b(0) \ldots b(N-1)$. The noise power estimate may be computed for each burst.

A C/I estimator 370 may then compute a C/I estimate (or a burst SNR estimate) for the received GMSK signal, as follows:

$$C/I_{bpsk} = \frac{P_{signal}}{P_{noise}} = \frac{\sum_{n=0}^{M-1} |\hat{h}(n)|^2}{E[|\hat{w}(n)|^2]}. \quad \text{Eq (10)}$$

Equation (10) indicates that, assuming the error due to the GMSK to BPSK approximation is negligible, the accuracy of the C/I estimate is dependent on the accuracy of the channel impulse response estimate, $\hat{h}(n)$. This is because the signal and noise power estimates are both derived based on $\hat{h}(n)$.

The C/I estimate obtained as shown in equation (10) is relatively accurate for low C/I conditions (e.g., for a received C/I of 12 dB or lower). However, this C/I estimate saturates for high C/I conditions (e.g., for a received C/I of 16 dB or more). The value to which the C/I estimate saturates is dependent on the manner in which the channel impulse response is estimated.

The saturation of the C/I estimate in equation (10) is due to the approximation of the received GMSK signal with just the dominant pulse shaping function $\tilde{c}_0(n)$, as shown in equation (6). For high C/I conditions, channel estimator 340 provides an accurate channel impulse response estimate for the estimated GMSK signal, so that $\hat{h}(n) \to \tilde{c}_0(n)$. Also for high C/I conditions, data detector 350 provides accurate bit estimates based on the rotated GMSK signal, so that $\hat{b}_0(n) \to b_0(n)$. The noise estimate, $\hat{w}(n)$, then includes the channel noise as well as signal components for all pulse shaping functions except for the dominant pulse shaping function. The noise estimate $\hat{w}(n)$ may thus be expressed as:

$$\hat{w}(n) \approx b_1(n)\tilde{c}_1(n)+b_2(n)\tilde{c}_2(n)+ \ldots +\tilde{w}(n). \quad \text{Eq (11)}$$

The "≈" sign in equation (11) may be replaced with an "=" sign if $\hat{h}(n)=\tilde{c}_0(n)$ and $\hat{b}_0(n)=b_0(n)$. The noise power estimate with the approximation error may then be expressed as:

$$P_{noise} = E[|\hat{w}(n)|^2] = \sum_{i\geq 1}\sum_{n} |\tilde{c}_i(n)|^2 + E[|\tilde{w}(n)|^2]. \quad \text{Eq (12)}$$

The C/I estimate in equation (10) may then be expressed as:

$$C/I_{bpsk} = \frac{\sum_{n=0}^{M-1} |\hat{h}(n)|^2}{E[|\hat{w}(n)|^2]} \approx \frac{\sum_{n=0}^{L-1} |\tilde{c}_0(n)|^2}{\sum_{i\geq 1}\sum_{n}|\tilde{c}_i(n)|^2 + E[|\tilde{w}(n)|^2]}, \quad \text{Eq (13)}$$

where L is the length of the dominant effective pulse shaping function, $\tilde{c}_0(n)$.

Equation (13) indicates that the approximation of the received GMSK signal with just the dominant pulse shaping function, $\tilde{c}_0(n)$, results in the remaining pulse shaping functions $\tilde{c}_1(n)$, $\tilde{c}_2(n)$, and so on, being treated as noise instead of as signal. Consequently, even with no channel noise, or $E[|\tilde{w}(n)|^2]=0$, the C/I estimate saturates at $C/I_{sat}$, which is:

$$C/I_{sat} = \frac{\sum_{n=0}^{L-1}|\tilde{c}_0(n)|^2}{\sum_{i\geq 1}\sum_{n}|\tilde{c}_i(n)|^2} = \frac{P_{dom}}{P_{rem}}, \quad \text{Eq (14)}$$

where $P_{dom}$ is the power of the dominant effective pulse shaping function; and $P_{rem}$ is the power of the remaining effective pulse shaping functions.

Computer simulation indicates that $C/I_{sat}$ is approximately 20 dB for GMSK. The power $P_{rem}$ may be viewed as an error due to GMSK-to-BPSK approximation. At low C/I conditions, the approximation error is less than the channel noise and has negligible impact on the accuracy of the C/I estimate. However, at high C/I conditions, the approximation error is larger than the channel noise and causes the C/I estimate to saturate at $C/I_{sat}$.

The true C/I for the received GMSK signal may be expressed as:

$$C/I_{true} = \frac{E[|\text{signal component in } r(n)|^2]}{E[|w(n)|^2]} \quad \text{Eq (15)}$$

$$= \frac{E[|\text{signal component in } \tilde{r}(n)|^2]}{E[|\tilde{w}(n)|^2]}.$$

The second equality in equation (15) follows from the fact that the rotation operation by rotator 330 does not change the signal power or noise power. The power of the signal components is the same in the received GMSK signal, $r(n)$, and the rotated GMSK signal, $\tilde{r}(n)$. Furthermore, the channel noise power is the same as the rotated noise power, or $E[|w(n)|^2]=E[|\tilde{w}(n)|^2]$. For an additive white Gaussian noise (AWGN) channel with a flat frequency response, equation (15) may be expressed as:

$$C/I_{true} = \frac{E[|\text{signal component in } \tilde{r}(n)|^2]}{E[|\tilde{w}(n)|^2]} \quad \text{Eq (16)}$$

$$= \frac{\sum_{n=0}^{L-1}|\tilde{c}_0(n)|^2 + \sum_{i\geq 1}\sum_{n}|\tilde{c}_i(n)|^2}{E[|\tilde{w}(n)|^2]}.$$

As shown in equations (13) and (16), the saturation of the C/I estimate results from treating the signal power in the remaining pulse shaping functions as a noise component in equation (13) instead of as a signal component in equation (16).

A more accurate C/I estimate, $C/I_{est}$, may be obtained for the received GMSK signal by accounting for the GMSK-to-BPSK approximation error, as follows:

$$C/I_{est} = \frac{\sum_{n=0}^{M-1}|\hat{h}(n)|^2 + P_{error}}{E[|\hat{w}(n)|^2] - P_{error}} \qquad \text{Eq (17)}$$

$$\approx \frac{\sum_{n=0}^{L-1}|\tilde{c}_0(n)|^2 + \sum_{i\geq 1}\sum_n |\tilde{c}_i(n)|^2}{E[|\tilde{w}(n)|^2]},$$

where $P_{error}$ is an estimate of $P_{rem}$. Equation (17) is obtained using equations (13) and (16). As noted above, $P_{rem}$ is approximately 20 dB smaller than $P_{dom}$. Also, $P_{dom}$ may be assumed to be equal to the signal power, or $$P_{dom} = \sum_{n=0}^{L-1}|\tilde{c}_0(n)|^2 \approx \sum_{n=0}^{M-1}|\hat{h}(n)|^2 = P_{signal}. \qquad \text{Eq (18)}$$

In this case, $P_{error}$, may be estimated based on the signal power, as follows:

$$P_{error} = 10^{-\Delta/10} \times \sum_{n=0}^{L-1}|\hat{h}(n)|^2 \approx 0.01 \times \sum_{n=0}^{M-1}|\hat{h}(n)|^2, \qquad \text{Eq (19)}$$

where $\Delta$ is the difference between $P_{dom}$ and $P_{rem}$ (in dB) and is estimated as $\Delta \approx 20$ dB in equation (19) for GMSK.

The assumption shown in equation (18) is generally more accurate for high C/I conditions than low C/I conditions because the channel impulse response estimate is more accurate for high C/Is. Consequently, the accuracy of the estimate shown in equation (18) is dependent on the C/I of the received GMSK signal. However, an appropriate value may be selected for the parameter $\Delta$ such that an accurate C/I estimate may be obtained for a wide range of received C/Is.

As shown in equation (17) the approximation error estimate, $P_{error}$, is subtracted from the noise power estimate $E[|\hat{w}(n)|^2]$ in the computation of $C/I_{est}$. The result of this subtraction may be zero or a negative value due to various reasons such as, for example, the use of a finite number of samples to estimate the signal power and noise power. If this occurs, then $C/I_{est}$ may be set to a predetermined maximum C/I value, or $C/I_{est} = C/I_{max}$.

Figure 4:
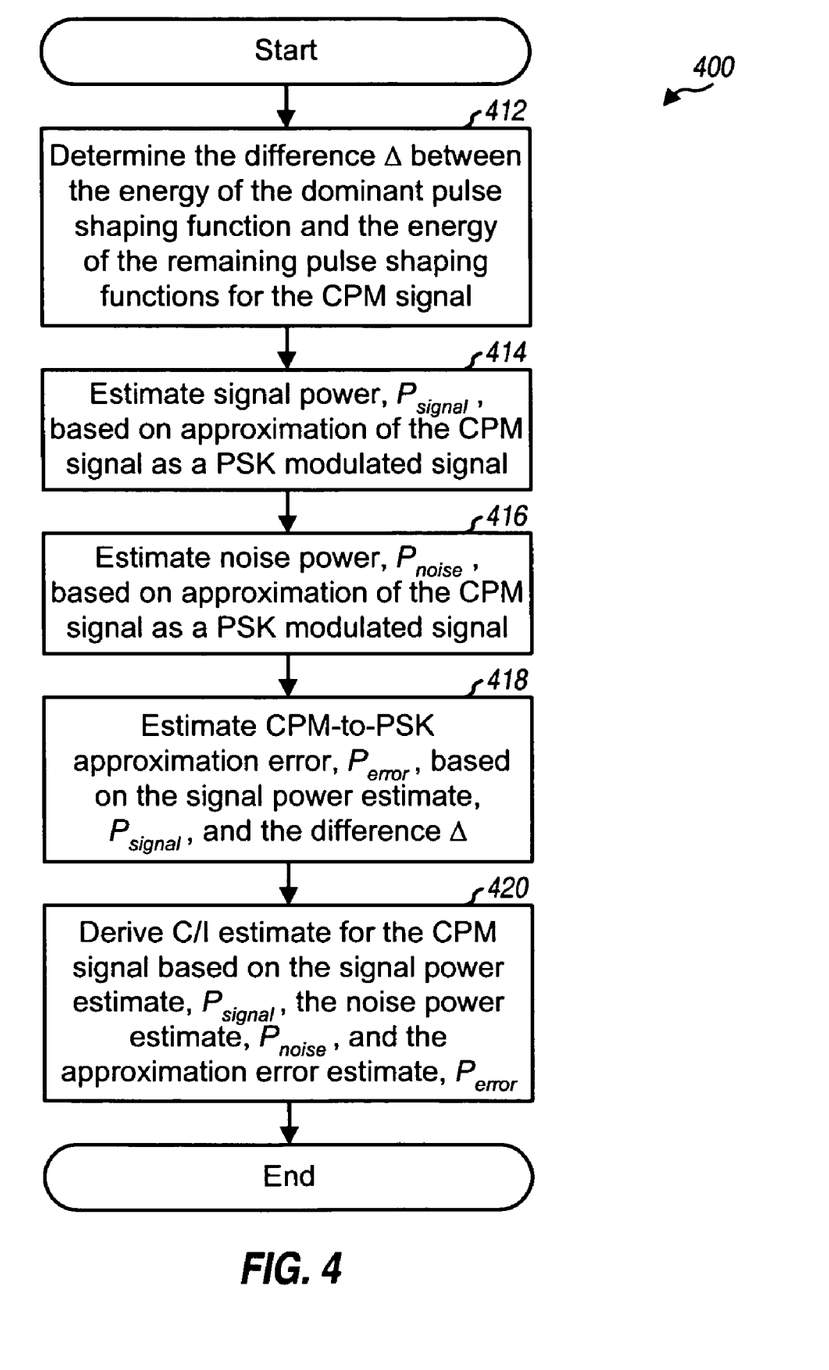
FIG. 4 shows a process to derive a C/I estimate for a CPM signal.

FIG. 4 shows a flow diagram of a process 400 to derive a C/I estimate for a CPM signal (e.g., a GMSK signal). Initially, an appropriate value is determined for the parameter $\Delta$, which indicates the difference between the energy of the dominant effective pulse shaping function and the energy of the remaining effective pulse shaping functions (block 412). For any CPM scheme/format that may be selected for use, a set of pulse shaping functions $\{c_i(n)\}$ for that CPM scheme/format may be determined based on applicable parameter values for that CPM scheme/format (e.g., the BT value for the Gaussian lowpass filter) and as described by Laurent. An effective pulse shaping function $\tilde{c}_i(n)$ may be derived for each pulse shaping function $c_i(n)$ based on the impulse response p(n) of the propagation channel, or $\tilde{c}_i(n) = j^{-n} \cdot c_i(n) p(n)$. The parameter $\Delta$ may then be set to the ratio of the energy of the dominant effective pulse shaping function, $\tilde{c}_0(n)$, to the energy of the remaining effective pulse shaping functions, $\tilde{c}_i(n)$ for $i=1, 2, \ldots$, as follows:

$$\Delta = 10\log_{10}\left(\frac{\sum_{n=0}^{L-1}|\tilde{c}_0(n)|^2}{\sum_{i\geq 1}\sum_n |\tilde{c}_i(n)|^2}\right) \approx 10\log_{10}\left(\frac{\sum_{n=0}^{M-1}|\hat{h}(n)|^2}{\sum_{i\geq 1}\sum_n |\tilde{c}_i(n)|^2}\right). \qquad \text{Eq (20)}$$

For an AWGN channel, the impulse response p(n) contains a single tap of unit magnitude, and $\tilde{c}_i(n) = j^{-n} \cdot c_i(n)$. For a multipath channel, the impulse response p(n) contains multiple taps. The value for $\Delta$ may be determined via computer simulation, empirical measurement, and so on, and (for simplicity) by assuming using the same delta value as that for an AWGN channel.

The signal power for the received CPM signal is then estimated based on an approximation of the received CPM signal as a PSK signal (block 414). The signal power estimate, $P_{signal}$, may be computed based on the channel impulse response estimate, as shown in equation (8), or based on a reconstructed signal. The noise in the received CPM signal is computed and the noise power is estimated based on the CPM-to-PSK approximation (block 416). For example, the noise estimate may be computed as shown in equation (7) and the noise power estimate, $P_{noise}$, may be computed as shown in equation (9). The CPM-to-PSK approximation error is then estimated based on the signal power estimate, $P_{signal}$, and the parameter $\Delta$, for example, as $P_{error} = 10^{-\Delta/10} \times P_{signal}$ (block 418). The C/I estimate for the received CPM signal is then derived based on the signal power estimate, $P_{signal}$, a the noise power estimate, $P_{noise}$, and the approximation error estimate, $P_{error}$. (block 420), as follows:

$$C/I_{est} = \frac{P_{signal} + P_{error}}{P_{noise} - P_{error}}. \qquad \text{Eq (21)}$$

The C/I estimate may further be post-processed (e.g., filtered over multiple bursts) to obtain a more reliable estimate of the received C/I.

Process 400 may be used to derive an accurate C/I estimate for any CPM signal that is approximated as a PSK signal. In general, the received CPM signal may be approximated with one or multiple pulse shaping functions. The parameter $\Delta$ would then indicate the difference between the energy of all pulse shaping functions used to appropriate the PSK signal and the energy of all remaining pulse shaping functions.

As noted above, the channel impulse response estimate impacts both the signal power estimate and the noise power estimate, both of which in turn impact the C/I estimate. The channel impulse response may be estimated in various manners. Several channel estimation schemes are specifically described below for GSM.

Figure 5:
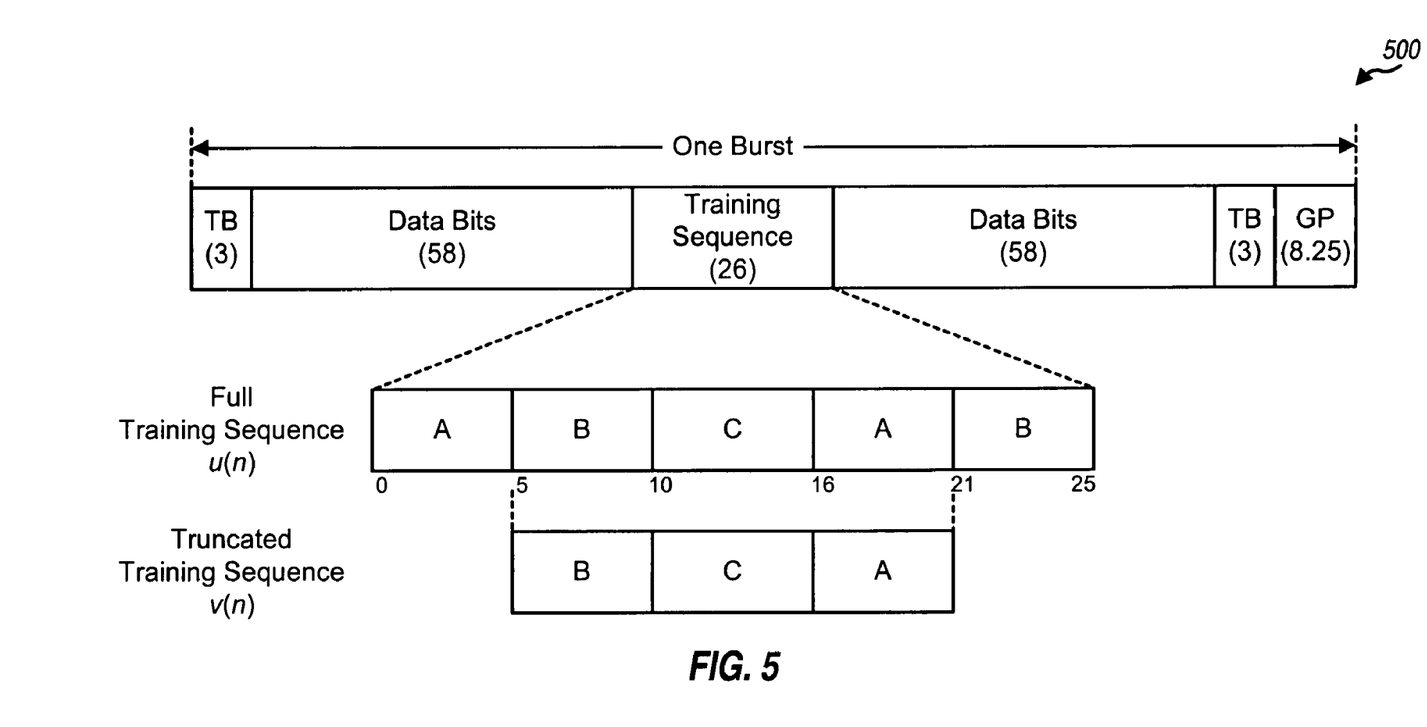
FIG. 5 shows a burst format used in GSM.

FIG. 5 shows a burst format 500 used in GSM for transmission of traffic data. Each burst includes two tail bit (TB) fields, two data fields, a training sequence field, and a guard period (GP). The number of bits for each field is shown inside the parentheses. Each burst is transmitted in one time slot, which is 0.577 msec in GSM.

GSM defines eight different training sequences (or midambles) that may be sent in the training sequence field. Each training sequence contains 26 bits and is defined such that the first five bits (labeled as 'A') are repeated and the second five bits (labeled as 'B') are also repeated, as shown in FIG. 5. Each training sequence u(n) is also defined such that the correlation of that sequence with a 16-bit truncated version of that sequence, v(n), is equal to (1) 16 for a zero time shift (as shown in FIG. 5), (2) zero for time shifts of ±1, ±2, ±3, ±4, and ±5, and (3) a zero or non-zero value for any other time shift. For an ideal training sequence, the autocorrelation is a maximum value with no time shift and zero for all other time shifts.

Figure 6A:
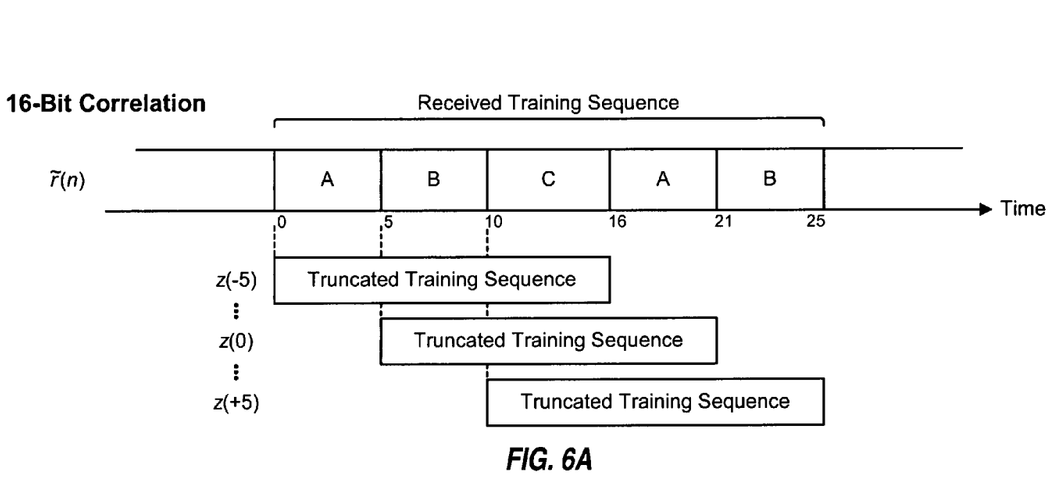
FIGS. 6A and 6B show estimation of a channel impulse response based on correlation with truncated and full training sequences, respectively.

FIG. 6A shows the estimation of a channel impulse response based on correlation with the 16-bit truncated training sequence v(n). The estimated GSM signal, $\hat{r}(n)$, for the training sequence portion may be expressed as:

$$\hat{r}(n) \approx h(n) \otimes u_0(n) + \tilde{w}(n) = \sum_{i=0}^{M-1} h(i) \cdot u_0(n-i) + \tilde{w}(n), \quad \text{Eq (22)}$$

where $u_0(n)$ represents the input symbols for the dominant pulse shaping function $c_0(n)$, which are derived based on the training sequence bits u(n) and using the same transformation as for $b_0(n)$. Because of the GMSK-to-BPSK approximation, the estimated GSM signal, $\hat{r}(n)$, for the training sequence may be viewed as containing only the input symbols $u_0(n)$ for the dominant pulse shaping function $c_0(n)$.

The correlation between the samples in the rotated GMSK signal, $\hat{r}(n)$, and the truncated training sequence, v(n), may be expressed as:

$$z(n) = \sum_{i=0}^{K-1} \hat{r}(n+i) \cdot v_0^*(i) \quad \text{Eq (23)}$$
$$\approx \sum_{j=0}^{M-1} h(j) \cdot \left[ \sum_{i=0}^{K-1} u_0(n+i-j) \cdot v_0^*(i) \right] + w'(n)$$
$$\approx K \cdot h(n),$$

where $v_0(i)$ is a 16-bit truncated portion of the 26-bit sequence $u_0(n)$, "*" denotes a complex conjugate, K=16, and w'(n) is post-processed noise obtained from processing $\tilde{w}(n)$ in $\hat{r}(n)$ with $v_0^*(i)$. Equation (23) indicates that the correlation result z(n) for each time offset n is approximately equal to a scaled version of the channel tap at that time offset. The correlation result z(n) may thus be used as the channel tap estimate for that time offset. The correlation may be performed for different time offsets in a small window (e.g., of 10 bit periods) centered at the expected peak in the correlation, which is the start of the first 'B' portion. Because the autocorrelation of the truncated training sequence is zero for time offsets of +5 to −5 bit periods, the channel tap estimates do not contain correlation error for these time offsets.

Figure 6B:
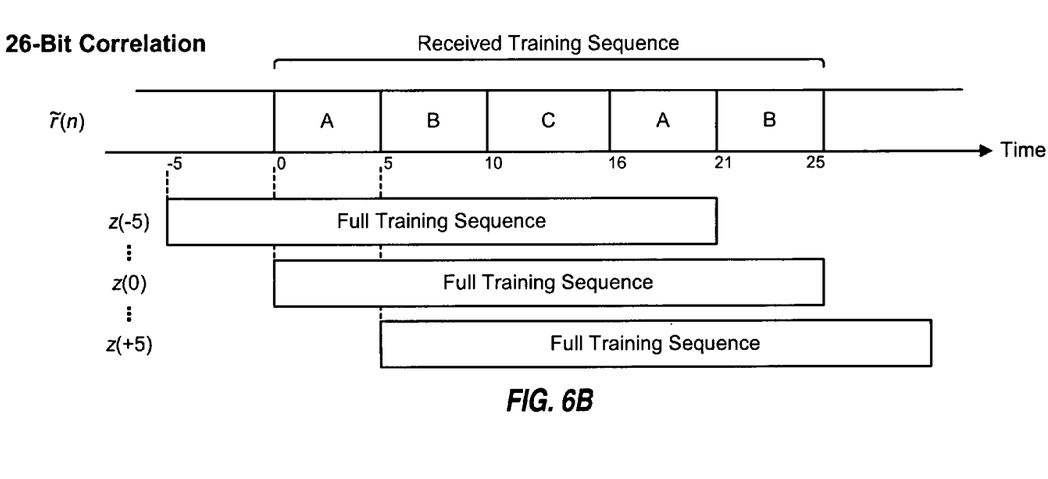

FIG. 6B shows the estimation of a channel impulse response based on correlation with the 26-bit full training sequence, u(n). The samples in the rotated GMSK signal, $\hat{r}(n)$, and the training sequence input symbols, $u_0(n)$, for the dominant pulse shaping function are correlated for different time offsets in a small window (e.g., of 10 bit periods) centered at the expected peak in the correlation, which in this case is the start of the first 'A' portion. The correlation result z(n) for each time offset n is approximately equal to a scaled version of the channel tap at that time offset. The use of a longer sequence for the correlation allows more energy to be collected for the channel tap estimates. However, because the autocorrelation of the full training sequence, u(n), is zero for only certain specific time offsets, the channel tap estimates contain correlation errors at time offsets with non-zero autocorrelation.

The correlation as shown in FIG. 6A or 6B provides correlation results z(n) for different time offsets. These correlation results may be used directly as the channel taps for the channel impulse response estimate. Alternatively, the correlation results may be post-processed, for example, using a least mean square (LMS) procedure, a Weiner Hopf procedure, or some other procedure that can account for the non-ideal autocorrelation properties of the training sequences, u(n), used in GSM. The channel tap estimates may also be processed, for example, by discarding channel taps with power less than a predetermined threshold.

The C/I estimate derived as described herein may be advantageously used for various purposes. Some exemplary uses are described below.

The C/I estimate may be used to select an appropriate data rate (or simply, a rate) for data transmission. For example, in GSM, an Adaptive Multi-Rate (AMR) vocoder is used to encode speech data. The AMR vocoder supports multiple coder/decoder (codec) modes, and each codec mode is associated with a specific rate. For example, AMR Full Rate supports 8 codec modes for 8 rates of 12.2, 10.2, 7.95, 7.4, 6.7, 5.9, 5.15, and 4.75 kbps. The codec mode for 12.2 kbps has the highest rate and lowest compression ratio, and the AMR vocoder generates 12.2 kbps ×20 msec=244 bits for each 20 msec block of speech data. Each 20 msec block of data is encoded to obtain 456 code bits that can be transmitted in a fixed frame structure used in GSM. The AMR vocoder provides different amounts of redundancy for different codec modes. The codec mode with the highest rate provides the least amount of redundancy, which then results in the least error correction capability. The converse is true for the codec mode with the lowest rate. Codec modes for higher rates are thus typically used for good channel conditions, and codec modes for lower rates are usually used for bad channel conditions. This adaptation between data coding and channel conditions is used to achieve a good tradeoff between voice quality and communication error rates.

A receiving entity (which may be a wireless device or a base station) may derive a C/I estimate for each burst, as described above, and use this C/I estimate as a channel quality indicator. C/I estimates for multiple bursts may be filtered, e.g., based on a running average. The (filtered or unfiltered) C/I estimate may be compared against a set of C/I thresholds, e.g., on a burst-by-burst basis. Based on the result of the comparison, the receiving entity may determine whether to request the transmitting entity to use a different codec mode that can achieve a better tradeoff between voice quality and probability of reliable transmission. For example, if the C/I estimate exceeds a predetermined C/I threshold, then the channel condition may be considered to be sufficiently improved, and the receiving entity may request a codec mode that performs less compression and thus provides higher voice quality. This benefit is obtained at the expense of less error protection, which may be acceptable because of the improved channel condition. A C/I threshold as high as 28 dB may be used for certain instances. The techniques described herein allow the receiving entity to estimate and report high received C/Is, which allows for the selection of codec modes with higher rates for good channel conditions.

C/I estimates may also be used to scale multiple bursts received via a wireless channel, prior to decoding. For GSM, the transmitting entity may partition each block of data into multiple subblocks and may transmit each subblock as a burst in one time slot. The wireless channel may distort each transmitted burst with a different channel response and may further degrade each transmitted burst with different amount of noise. The receiving entity receives the transmitted bursts and processes each received burst to obtain soft-decision metrics (or simply, "soft metrics") for the burst. A soft metric is a multi-bit value obtained by the receiving entity for a single-bit (or "hard") value sent by the transmitting entity. The receiving entity may scale the soft metrics for each received burst for a given data block with a scaling factor that is determined based on the C/I estimate for that burst. The scaling of each burst based on its C/I estimate allows different bursts to be given appropriate weight in the decoding process based on their C/I estimates.

A C/I estimate may also be used as a bad frame indicator (BFI) to determine whether a received burst is "good" or "bad". For example, a C/I estimate may be derived for each burst and compared against a C/I threshold. The burst may be declared "good" if the C/I estimate is above the C/I threshold and other criteria (if any) are met and "bad" otherwise. The burst may be further decoded if deemed to be "good" and discarded otherwise. The bad frame indicator may also be used for other purposes. For example, if the burst is deemed to be "good", then pertinent information may be collected and used for automatic frequency control (AFC), time tracking, and so on. Different C/I thresholds may be used for different purposes.

Some exemplary uses of the C/I estimate have been described above. The C/I estimate may also be used for other purposes, and this is within the scope of the invention.

The C/I estimation techniques described herein may be implemented by various means. For example, these techniques may be implemented in hardware, software, or a combination thereof. For a hardware implementation, the processing units used to perform C/I estimation (e.g., the processing units shown in FIG. 3) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the C/I estimation techniques may be implemented with modules (e.g., procedures, functions, and so on) that perform the functions described herein. The software codes may be stored in a memory unit (e.g., memory unit 172 in FIG. 1) and executed by a processor (e.g., controller 170). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of estimating signal quality (C/I) in a communication system utilizing continuous phase modulation (CPM), comprising:
   estimating signal power in a received CPM signal;
   estimating noise power in the received CPM signal;
   estimating error due to approximation of the received CPM signal with another modulation format different from CPM; and
   deriving a C/I estimate for the received CPM signal based on the estimated signal power, the estimated noise power, and the estimated approximation error.

2. The method of claim 1, wherein the received CPM signal is approximated as a phase shift keying (PSK) modulated signal, and wherein the signal power and the noise power are estimated based on the approximation of the received CPM signal as a PSK modulated signal.

3. The method of claim 1, wherein the received CPM signal is a Gaussian minimum shift keying (GMSK) modulated signal and is approximated as a binary phase shift keying (BPSK) modulated signal.

4. The method of claim 1, wherein the received CPM signal is formed based on a plurality of pulse shaping functions, and wherein the received CPM signal is approximated with a dominant pulse shaping function having largest energy among the plurality of pulse shaping functions.

5. The method of claim 4, wherein the approximation error is estimated based on a parameter indicative of a ratio of energy of the dominant pulse shaping function to energy of remaining ones of the plurality of pulse shaping functions.

6. The method of claim 5, wherein the parameter is set to approximately 20 decibels (dB).

7. The method of claim 5, wherein the approximation error is further estimated based on the estimated signal power.

8. The method of claim 1, further comprising:
   deriving a channel impulse response estimate based on the received CPM signal, and wherein the signal power and the noise power are estimated based on the channel impulse response estimate.

9. The method of claim 8, wherein the estimated signal power is equal to energy of the channel impulse response estimate.

10. The method of claim 8, wherein the estimating the noise power comprises:
    detecting bits in the received CPM signal;
    generating a reconstructed signal based on the detected bits and the channel impulse response estimate;
    deriving a noise estimate based on the received CPM signal and the reconstructed signal; and
    computing power of the noise estimate to obtain the estimated noise power.

11. The method of claim 8, wherein the channel impulse response estimate is derived based on the approximation of the received CPM signal with another modulation format.

12. The method of claim 1, wherein the channel impulse response estimate is derived by correlating the received CPM signal with a known training sequence.

13. The method of claim 12, wherein the received CPM signal is formed based on a plurality of pulse shaping functions, and wherein the known training sequence is for a dominant pulse shaping function having largest energy among the plurality of pulse shaping functions.

14. The method of claim 1, further comprising:
comparing the C/I estimate against one or more C/I thresholds; and
selecting a data rate based on a result of the comparison.

15. The method of claim 14, wherein at least one of the one or more C/I thresholds is 20 decibels (dB) or higher.

16. The method of claim 1, further comprising:
obtaining a plurality of bursts of data from the received CPM signal;
deriving a C/I estimate for each of the plurality of bursts; and
scaling each burst of data based on the C/I estimate derived for the burst.

17. The method of claim 1, further comprising:
comparing the C/I estimate against a C/I threshold; and
declaring a block of data obtained from the received CPM signal as good or bad based on a result of the comparison.

18. The method of claim 1, further comprising:
filtering C/I estimates derived for a plurality of time intervals to obtain filtered C/I estimates having greater reliability.

19. The method of claim 1, wherein the communication system is applied in a Global System for Mobile Communications (GSM) system.

20. A method of estimating signal quality (C/I) in a Global System for Mobile Communications (GSM) system, comprising:
estimating signal power in a received Gaussian minimum shift keying (GMSK) modulated signal;
estimating noise power in the received GMSK modulated signal;
estimating error due to approximation of the received GMSK modulated signal as a phase shift keying (PSK) modulated signal; and
deriving a C/I estimate for the received GMSK modulated signal based on the estimated signal power, the estimated noise power, and the estimated approximation error.

21. An apparatus operable to estimate signal quality (C/I) in a wireless communication system utilizing continuous phase modulation (CPM), comprising:
a signal estimator operative to estimate signal power in a received CPM signal;
a noise estimator operative to estimate noise power in the received CPM signal; and
a C/I estimator operative to estimate error due to approximation of the received CPM signal with another modulation format different from CPM and to derive a C/I estimate for the received CPM signal based on the estimated signal power, the estimated noise power, and the estimated approximation error.

22. The apparatus of claim 21, wherein the received CPM signal is approximated as a phase shift keying (PSK) modulated signal, and wherein the signal power and the noise power are estimated based on the approximation of the received CPM signal as a PSK modulated signal.

23. The apparatus of claim 21, wherein the received CPM signal is formed based on a plurality of pulse shaping functions, wherein the received CPM signal is approximated with a dominant pulse shaping function having largest energy among the plurality of pulse shaping functions, and wherein the approximation error is estimated based on a parameter indicative of a ratio of energy of the dominant pulse shaping function to energy of remaining ones of the plurality of pulse shaping functions.

24. The apparatus of claim 21, further comprising:
a channel estimator operative to derive a channel impulse response estimate based on the received CPM signal, and wherein the signal power and the noise power are estimated based on the channel impulse response estimate.

25. An apparatus operable to estimate signal quality (C/I) in a wireless communication system utilizing continuous phase modulation (CPM), comprising:
means for estimating signal power in a received CPM signal;
means for estimating noise power in the received CPM signal;
means for estimating error due to approximation of the received CPM signal with another modulation format different from CPM; and
means for deriving a C/I estimate for the received CPM signal based on the estimated signal power, the estimated noise power, and the estimated approximation error.

26. The apparatus of claim 25, wherein the received CPM signal is approximated as a phase shift keying (PSK) modulated signal, and wherein the signal power and the noise power are estimated based on the approximation of the received CPM signal as a PSK modulated signal.

27. The apparatus of claim 25, wherein the received CPM signal is formed based on a plurality of pulse shaping functions, wherein the received CPM signal is approximated with a dominant pulse shaping function having largest energy among the plurality of pulse shaping functions, and wherein the approximation error is estimated based on a parameter indicative of a ratio of energy of the dominant pulse shaping function to energy of remaining ones of the plurality of pulse shaping functions.

28. The apparatus of claim 25, further comprising:
means for deriving a channel impulse response estimate based on the received CPM signal, and wherein the signal power and the noise power are estimated based on the channel impulse response estimate.

29. A processor readable media for storing instructions operable in a wireless device to:
estimate signal power in a received continuous phase modulation (CPM) signal;
estimate noise power in the received CPM signal;
estimate error due to approximation of the received CPM signal with another modulation format different from CPM; and
derive a signal quality (C/I) estimate for the received CPM signal based on the estimated signal power, the estimated noise power, and the estimated approximation error.

* * * * *